(12) United States Patent
Randall et al.

(10) Patent No.: US 10,489,938 B2
(45) Date of Patent: *Nov. 26, 2019

(54) DIGITAL PAINT GENERATION FEEDBACK

(71) Applicant: Adobe Inc., San Jose, CA (US)

(72) Inventors: Mark M. Randall, Folsom, CA (US); Abraham Moshe Muchnick, Woodmere, NY (US); Benoit Ambry, Fair Oaks, CA (US); Kushith C. Amerasinghe Godagamage, San Francisco, CA (US); Jean-Sylvere Charles Simonet, Rockville, MD (US)

(73) Assignee: Adobe Inc., San Jose, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 15/716,311

(22) Filed: Sep. 26, 2017

(65) Prior Publication Data

US 2019/0096096 A1 Mar. 28, 2019

(51) Int. Cl.
*G09G 5/02* (2006.01)
*G06T 11/00* (2006.01)
*G06F 3/0484* (2013.01)
*G06F 3/0488* (2013.01)
*G06T 1/20* (2006.01)

(52) U.S. Cl.
CPC .......... *G06T 11/001* (2013.01); *G06F 3/0488* (2013.01); *G06F 3/04842* (2013.01); *G06T 1/20* (2013.01); *G06T 2200/24* (2013.01)

(58) Field of Classification Search
CPC .................................................. G06T 11/001
See application file for complete search history.

(56) References Cited

U.S. PATENT DOCUMENTS

| 5,409,379 A | 4/1995 | Montag et al. |
| 5,432,896 A * | 7/1995 | Hwong ................ G06T 11/001 345/592 |
| 9,240,063 B1 | 1/2016 | Tremblay et al. |
| 9,734,635 B1 | 8/2017 | Gorumkonda |
| 2009/0085880 A1 * | 4/2009 | Vitale ................. B60R 11/0264 345/173 |
| 2009/0222469 A1 | 9/2009 | Maillot et al. |

(Continued)

OTHER PUBLICATIONS

"First Action Interview Office Action", U.S. Appl. No. 15/701,330, filed Mar. 7, 2019, 62 pages.

(Continued)

*Primary Examiner* — Charles Tseng
(74) *Attorney, Agent, or Firm* — SBMC

(57) ABSTRACT

Digital paint generation techniques and systems are described that are configured to bridge a perceived divide between functionality made available to users to create digital image and the users' understanding as to how this functionality is to be used. A variety of techniques and systems are described that support this expansion. In one example, a control is used to adjust color and/or physical digital paint properties to generate digital paint. Further, feedback is also supported such that the digital paint generated from properties is changed in real time as changes are made to the properties, e.g., amounts of digital paint properties used to generate the digital paint.

20 Claims, 15 Drawing Sheets

(5 of 15 Drawing Sheet(s) Filed in Color)

(56) References Cited

U.S. PATENT DOCUMENTS

| | | | |
|---|---|---|---|
| 2009/0262130 A1* | 10/2009 | Ramirez | G06T 11/001 345/595 |
| 2011/0271216 A1 | 11/2011 | Wilson | |
| 2011/0274348 A1 | 11/2011 | Oicherman et al. | |
| 2014/0132617 A1* | 5/2014 | Bhattacharyay | G06T 11/001 345/582 |
| 2014/0132619 A1* | 5/2014 | Landsberger | G06T 11/001 345/589 |
| 2014/0153825 A1* | 6/2014 | Jones | G06T 11/001 382/167 |
| 2014/0267223 A1 | 9/2014 | Sumner et al. | |
| 2019/0079661 A1 | 3/2019 | Randall et al. | |
| 2019/0080485 A1 | 3/2019 | Randall et al. | |
| 2019/0080486 A1 | 3/2019 | Randall et al. | |
| 2019/0080487 A1 | 3/2019 | Randall | |

OTHER PUBLICATIONS

"Pre-Interview First Office Action", U.S. Appl. No. 15/701,029, filed Feb. 4, 2019, 65 pages.

"Pre-Interview First Office Action", U.S. Appl. No. 15/701,182, filed Feb. 4, 2019, 54 pages.

"Pre-Interview First Office Action", U.S. Appl. No. 15/701,303, filed Feb. 19, 2019, 32 pages.

"Pre-Interview First Office Action", U.S. Appl. No. 15/701,330, filed Jan. 22, 2019, 62 pages.

"Final Office Action", U.S Appl. No. 15/701,330, filed May 3, 2019, 21 pages.

"First Action Interview Office Action", U.S. Appl. No. 15/701,303, filed Apr. 4, 2019, 32 pages.

"First Action Interview Office Action", U.S. Appl. No. 15/701,182, Mar. 20, 2019, 54 pages.

"First Action Interview Office Action", U.S. Appl. No. 15/701,029, filed Mar. 20, 2019, 65 pages.

"Notice of Allowance", U.S. Appl. No. 15/701,303, filed Jun. 12, 2019, 8 pages.

"Supplemental Notice of Allowance", U.S. Appl. No. 15/701,303, dated Oct. 3, 2019, 2 pages.

"Notice of Allowance", U.S. Appl. No. 15/701,029, dated Jun. 27, 2019, 9 pages.

"Notice of Allowance", U.S. Appl. No. 15/701,182, dated Jul. 12, 2019, 10 pages.

"Notice of Allowance", U.S. Appl. No. 15/701,330, dated Aug. 13, 2019, 11 pages.

"Supplemental Notice of Allowance", U.S. Appl. No. 15/701,029, dated Sep. 9, 2019, 2 pages.

"Supplemental Notice of Allowance", U.S. Appl. No. 15/701,303, dated Jul. 3, 2019, 2 pages.

"Supplemental Notice of Allowance", U.S. Appl. No. 15/701,303, dated Aug. 21, 2019, 2 pages.

\* cited by examiner

300

302
Receive, by a digital paint mixing system executed by a central processing unit of the computing device, a user input specifying amounts of respective ones of a plurality of digital paint properties to be used to generate digital paint

304
Communicate, by the digital paint mixing system from the central processing unit to a pixel shader of a graphics processing unit, data indicating the specified amounts of the respective ones of a plurality of digital paint properties

306
Rasterize, by the pixel shader of the graphics processing unit, the digital paint as a trait for each pixel of a plurality of pixels in a frame buffer based on the specified amounts of the respective ones of a plurality of digital paint properties

308
Display, by a display device of the computing device, the rasterized digital paint in real time from the frame buffer as the user input is received

*Fig. 3*

DIGITAL PAINT GENERATION FEEDBACK

BACKGROUND

The ways in which users are able to create digital images through interaction with computing devices continues to expand. However, the techniques used to select and generate colors have not kept pace with this expansion. For example, conventional techniques are limited to selecting a particular hue for a color, which limits functionality that otherwise may be made available to users. Additionally, these conventional techniques typically rely on complex user interface interactions and thus require expertise that make these systems unapproachable by untrained and novice users. Even once these user interface interactions are learned, conventional techniques to provide feedback regarding changes to the color are modal in that examples are successively output to replace previous colors, which therefore makes it difficult for the users to compare an effect of changes to the colors in conventional color section systems.

An example of this is complicated and complex techniques used by conventional systems to define and select colors for use in creating or modifying a digital image and limited feedback provided in response to this selection. In one conventional example, a color picker is used to select a fill or stroke color by choosing from a color field and spectrum, which defines the color numerically or by clicking a swatch. A swatch is a named color, tint, gradient, and pattern used to define the named color that are typically defined through a swatches panel and swatch library that are output in a user interface. The swatches panel includes options to select colors, gradients, and patterns for the named color.

Therefore, selection of a color in this technique relies on a user's understanding in how to interact with the color field and spectrum numerically and/or through the swatches panel and swatch library, which may be intimidating and confusing to novice and casual users. Further, changes made through this interaction cause a previously selected color to be replaced by a newly selected color, which causes the user to lose context and lack an ability to readily and accurately determine an effect of the changes. The user, for instance, may repeatedly make and remove changes to select a color to view an effect of these changes, which is inefficient and frustrating.

In another conventional example, a color panel is used to apply and edit an object's fill or stroke in a user interface. The color panel typically includes numerical options to select color values, a color spectrum bar, and a color slider. To select a color, a user first selects a color mode (e.g., RGB, CMYK) and then drags or clicks the slider to set numerical color values, enters the numerical values directly as text, or selects a point on a static color spectrum bar. Thus, the user is tasked with manually selecting color values and/or making a selection from the static color spectrum bar, which also requires specialized knowledge and thus may also be confusing to novice and casual users. Also, like the above example feedback is provided by replacing a previous color with a newly selected color, which causes the user to lose context and lack an ability to readily and accurately determine an effect of the changes.

Therefore, in each of the conventional examples above, a user may take years of practice and training in order to consistently achieve a desired result (e.g., a desired color for use as part of a digital image) due to complications of the conventional techniques used to select colors. This challenge is increased due to limitations of conventional feedback techniques used to replace previous results of this selection, which are modal and as such increase challenges in determining an effect of the changes due to limitations of the feedback.

SUMMARY

Digital paint generation techniques and systems are described that are configured to bridge a perceived divide between functionality made available to users to create digital images and the users' understanding as to how this functionality is to be used. This is accomplished through support of user interaction to specify digital paint properties and real time feedback regarding changes to these properties as part of generating digital paint. The feedback, for instance, may be output continuously in a user interface such that a series of successive changes to digital paint properties and an effect of those changes on generation of digital paint may be compared, one to another, through concurrent view in the user interface. In one example, the feedback is generated in real time through execution of a pixel shader implemented by a graphics processing unit of a computing device based on the digital paint properties. In this way, these digital paint generation techniques and systems as implemented by an image processing system expand accessibility of digital image creation techniques to a wider range of users and further support techniques and digital image that were not previously available to these users.

In one example, an image processing system supports user adjustment of digital paint properties to generate digital paint in a way that is readily understandable by a user. A user, for instance, may select different color digital paint properties (e.g., pigments) and interact with a control (e.g., as a dial) to define amounts of respective pigments to be used to generate digital paint. In this way, the user is provided with an ability to define both which pigments are to be used and an amount used of those pigments to generate the digital paint Further, the control may also be used to define amounts of physical digital paint properties as part of generating the digital paint, which is not available in conventional color selection systems. Physical digital paint properties, for instance, may be used to mimic physical digital paint in the real world, such as medium (e.g., chalk, ink), surface (e.g., paper, metal), instrument used to apply the medium (e.g., brush, pencil), technique used by the instrument to apply the medium (e.g., layered, blending), environment in which the medium and surface as disposed (e.g., lighting conditions), and so forth. The physical digital paint properties may also expand to realize capabilities that are not limited to the physical world, such as meta-conditions including particle gravity, attraction, sparkles, dynamic gradients and repulsion as part of an animation of the digital paint. Thus, the physical digital paint properties permit user interaction to expand beyond selection of colors as limited by conventional systems to also include how those physical properties define how digital paint having those colors is perceived when rendered in a user interface.

Further, feedback techniques are also supported such that the digital paint generated from properties is changed in real time (e.g., through use of a pixel shader) as changes are made to the properties, e.g., amounts of digital paint properties used to generate the digital paint. The feedback, for instance, may be configured as a continuous output of digital paint in the user interface, e.g., as following a line drawn by a finger of a user's hand in a user interface. This continuous output follows changes made to the digital properties that define the digital paint, e.g., in real time, as pixels are rasterized to a frame buffer of a graphics processing unit. Thus, the feedback may be used to compare effects of these changes to each other on the generation of digital paint, whether for color or physical digital paint properties. This is not possible using conventional color selection and feedback techniques that are modal and thus rely on successive replacement of colors in the user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

The patent or application file contains at least one drawing executed in color. Copies of this patent or patent application publication with color drawings will be provided by the Office upon request and payment of the necessary fee.

FIG. 3 is a flow diagram depicting a procedure in an example implementation involving execution of a pixel shader of FIG. 1 by a graphics processing unit to generate digital paint as feedback in real time.

DETAILED DESCRIPTION

Overview

Figure 1:
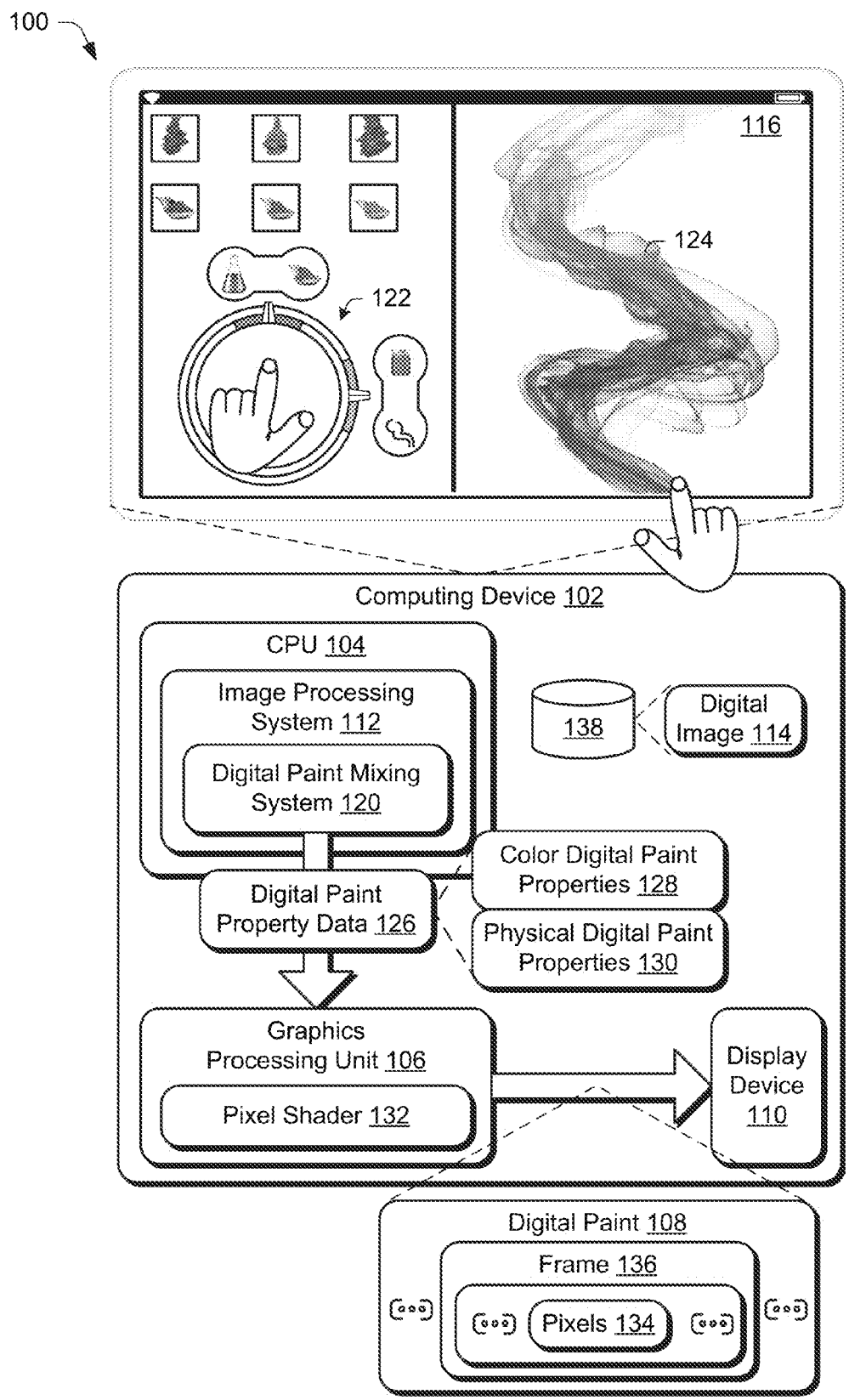
FIG. 1 is an illustration of a digital medium environment in an example implementation that is operable to employ digital paint generation techniques described herein.

Digital paint generation techniques and systems are described that are configured to bridge a perceived divide between functionality made available to users to create digital images and the users' understanding as to how this functionality is to be used. In one example, a digital paint generation technique provides real time feedback through execution of a pixel shader on a graphics processing unit based on parameters specified by digital paint properties and specified amounts of those properties. The real time feedback is usable to compare an effect of changes in digital paint properties to each other to generate digital paint. In this way, the user is not forced to engage in a "back and forth" involving application and removal of changes to digital paint perceive an effect of these changes on the digital paint. Rather, the user may readily compare an effect of changes to digital paint properties on the generation of digital paint to each other in the user interface.

An image processing system, for instance, supports user interaction to define digital paint properties to be used to generate digital paint. This includes color digital paint properties that define a pigment (e.g., hue) to be used to generate the digital paint, e.g., red, green, blue, etc. This may also include physical digital paint properties of digital paint having that defined pigment. The physical digital paint properties, for instance, may specify parameters for code that is executable by a graphics processing unit through use of a pixel shader to model real world and even imaginary characteristics as part of generating digital paint. A variety of different types of user interaction may be used to specify the digital paint properties as well as amounts of the digital paint properties to be used to generate digital paint.

The image processing system, for instance, may be configured to include functionality (e.g., a control) to specify amounts of two or more different pigments to generate a desired hue of digital paint, e.g., purple, indigo, chartreuse, and so on. The functionality may also be used to specify amounts of physical digital paint properties that are also used to generate the digital paint. Examples of physical digital paint properties include a medium (e.g., chalk, ink), surface (e.g., paper, metal), instrument used to apply the medium (e.g., brush, pencil), technique used by the instrument to apply the medium (e.g., layered, blending), environment in which the medium and surface as disposed (e.g., lighting conditions), and so forth. Thus, physical and color digital paint properties may be used to expand beyond conventional color selection techniques.

The adjustment of color and physical digital paint properties may be used by the image processing system to aid a user in understanding effects of their interaction. For example, a color digital paint property may represent a certain hue of red, e.g., R210, G10, B30. However, the same hue combined with a physical digital paint property may cause the hue to have the specularity of a heavy oil-based paint. This hue and physical digital paint property combination would be considered, when viewed by a user, to have a different color even though it is based on the same RGB value. Therefore, the user may view how combinations of color and/or physical digital paint properties interact with each other as part of digital paint generation through interaction with the control via a user interface.

As a result, the techniques and systems described herein expand beyond selection of pigments (i.e., colors) of conventional systems to also describe how digital paint having those pigments is to be physically perceived in a user interface. This is not possible using conventional techniques that are limited to selection of color, alone.

Further, creation of the digital paint may also be untethered from mimicking the physical world by creating digital paint having any physical digital paint property that can be imagined by the user and defined (e.g., mathematically implemented in executable code) for rendering by the computing device as further described as follows. The physical digital paint properties, for instance, may include meta-conditions including particle gravity, attraction, sparkles, dynamic gradients and repulsion as part of an animation of the digital paint. Consequently, the digital paint and digital images created using this paint by a pixel shader of a graphics processing unit may be created and rendered by the image processing system that has never been seen before.

Additionally, conventional techniques used to provide feedback as part of color selection caused a previously selected color to be replaced with a newly selected color in the user interface, i.e., are modal. In the color picker and color panel examples above, for instance, changes made using numerical options to select color values, a color spectrum bar, and a color slider caused a previous color based on previous values to be replaced with a color based on changes to these values. Thus, it was difficult for users of conventional systems to compare an effect of these changes in a user interface to each other. Accordingly, feedback techniques are described herein that are usable to compare an effect of these changes in a non-modal manner in real time through a continuous and concurrent output of rasterized digital paint in the user interface by a pixel shader that is generated based on changes made to the digital paint properties.

Continuing with the previous example, the control may be configured to generate inputs to specify amounts of digital paint properties (e.g., color and/or physical digital paint properties) to be used to generate digital paint as described above. A user may also simultaneously select a portion of a user interface (e.g., draw a freeform line), e.g., through interaction with touchscreen functionality of a display device by dragging a finger of the user's hand.

A pixel shader in this example is configured to generate the digital paint as feedback through execution by a graphics processing unit to have the amounts of the digital paint properties in real time and apply that digital paint to the selected portions of the user interface as feedback to the user. The user, for instance, may adjust the amounts of the digital paint properties with one hand (e.g., through interaction with a control) and simultaneously draw a freeform line with another hand In response, the pixel shader generates digital paint having those specified amounts of digital paint properties and applies that paint to the freeform line in real time.

In this way, the image processing system may provide efficient and intuitive feedback regarding an effect of the adjustments on the generation of the digital paint in real time through use of the pixel shader and graphics processing unit. Further, the user may also readily compare different portions of this digital paint to each other and thus compare an effect of changes on the corresponding digital paint properties to each other. This may therefore further increase a user's understanding of this interaction in a non-modal manner as opposed to conventional modal techniques that involves selection of amounts and then initiation of an operation to generate the digital paint.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ digital paint generation, feedback, and pixel shader techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 15.

The computing device 102 is illustrated as including a central processing unit 104 and graphics processing unit 106 that is configured to render digital paint 108 to a display device 110. The central processing unit 104 is a general purpose integrated circuit (i.e., chip) that is configured to execute operations of an application, operating system, and so on involving arithmetic, logical operations, control, and input/output operations. The graphics processing unit 106 is configured as a programmable logic chip (i.e., processor) that is specialized for display functions, such as to render images, animations, video, and so forth. The CPU 104 and GPU 106 may be implemented using different chipsets that are communicatively coupled via a motherboard, as a single integrated circuit, and so forth.

The computing device 102 is also illustrated as including an image processing system 112. The image processing system 112 is implemented at least partially in hardware of the computing device 102 (e.g., the CPU 104) to process and transform a digital image 114, which is illustrated as maintained in a storage device 138 of the computing device 102 as a computer-readable storage medium. Such processing includes creation of the digital image 114, modification of the digital image 114, and rendering of the digital image 114 in a user interface 116 for output, e.g., by the display device 110. Although illustrated as implemented locally at the computing device 102, functionality of the image processing system 112 may also be implemented as whole or part via functionality available via the network 118, such as part of a web service or "in the cloud."

An example of functionality incorporated by the image processing system 112 is represented as a digital paint mixing system 120. The digital paint mixing system 120 is implemented in functionality of the computing device 102 (e.g., a processing system and computer-readable storage media) to generate digital paint 108. The digital paint 108 is configured for storage in the storage device 138 and is configured to be rendered in the user interface 116 of the display device 110.

The digital paint mixing system 120 in this example is configured to support output of the user interface 116 as having a control 122 that is configured to specify amounts of digital paint properties that are to be used to generate digital paint 108. The generated digital paint 108 is displayed as feedback 124 in the user interface 116 in real time as described in greater detail below in relation to FIGS. 5-14.

In one example, a first hand of a user interacts with the control 122 to specify amounts of the digital paint properties that serve as a basis to generate the digital paint. In response, the digital paint mixing system 120 generates and outputs the digital paint 108 in real time as feedback 124 to follow another user input received via interaction with a second hand of the user.

The second hand, for instance, may draw a freeform line in the user interface 116. The digital paint mixing system 120, based on detection of the other input via touchscreen functionality, then generates the digital paint 108 in real time (e.g., through use of pixel shaders) continuously to follow the user input of the second hand as the feedback 124. In this way, the digital paint mixing system 120 provides real time feedback 124 regarding an effect of amounts of digital paint properties on generation of the digital paint 108 displayed in the user interface 116. Further, these effects may be readily compared through successive output of the feedback 124. In the illustrated example, for instance, changes made to color and physical digital paint properties may be readily viewed through successive changes to corresponding digital paint output as feedback 124 viewable concurrently in the user interface 116.

Execution of the digital paint mixing system 120 by the CPU 104, for instance, may be used to output the control 122 in the user interface 116. User interaction with the control 122 is used to generate digital paint property data 126. The digital paint property data 126 is used to specify amounts of selected digital paint properties that are to be used to generate the digital paint 108. Color digital paint properties describe hues of colors. Hues are an attribute of color by virtue of which it is discernible as red, green, blue, and so on, which is dependent on its dominant wavelength, and independent of intensity or lightness. Physical digital paint properties 130 describe physical characteristics that of colors that affect the appearance of those colors when viewed by a human. Examples of physical digital paint properties 130 include medium (e.g., chalk, ink), surface (e.g., paper, metal), instrument used to apply the medium (e.g., brush, pencil), technique used by the instrument to apply the medium (e.g., layered, blending), environment in which the medium and surface as disposed (e.g., lighting conditions, meta-conditions such as particle gravity and repulsion), and so forth.

The digital paint property data 126, for instance, is configured to specify parameters that are to be used by a pixel shader 132 as executed by the graphics processing unit 106 to rasterize colors of pixels 134 for frames 136 of an animation of the digital paint 108. Through execution of the pixel shader 132 by the graphics processing unit 106, the generated digital paint 108 and corresponding frames 136 and pixels 134 are displayed in real time in the user interface 116 as feedback 124. This is not possible in conventional modal techniques as described earlier. Further discussion of operation of the pixel shader 132 as part of real time generation of feedback 124 is described in the following section and shown in corresponding figures.

Digital Paint Generation Using a Pixel Shader

Figure 2:
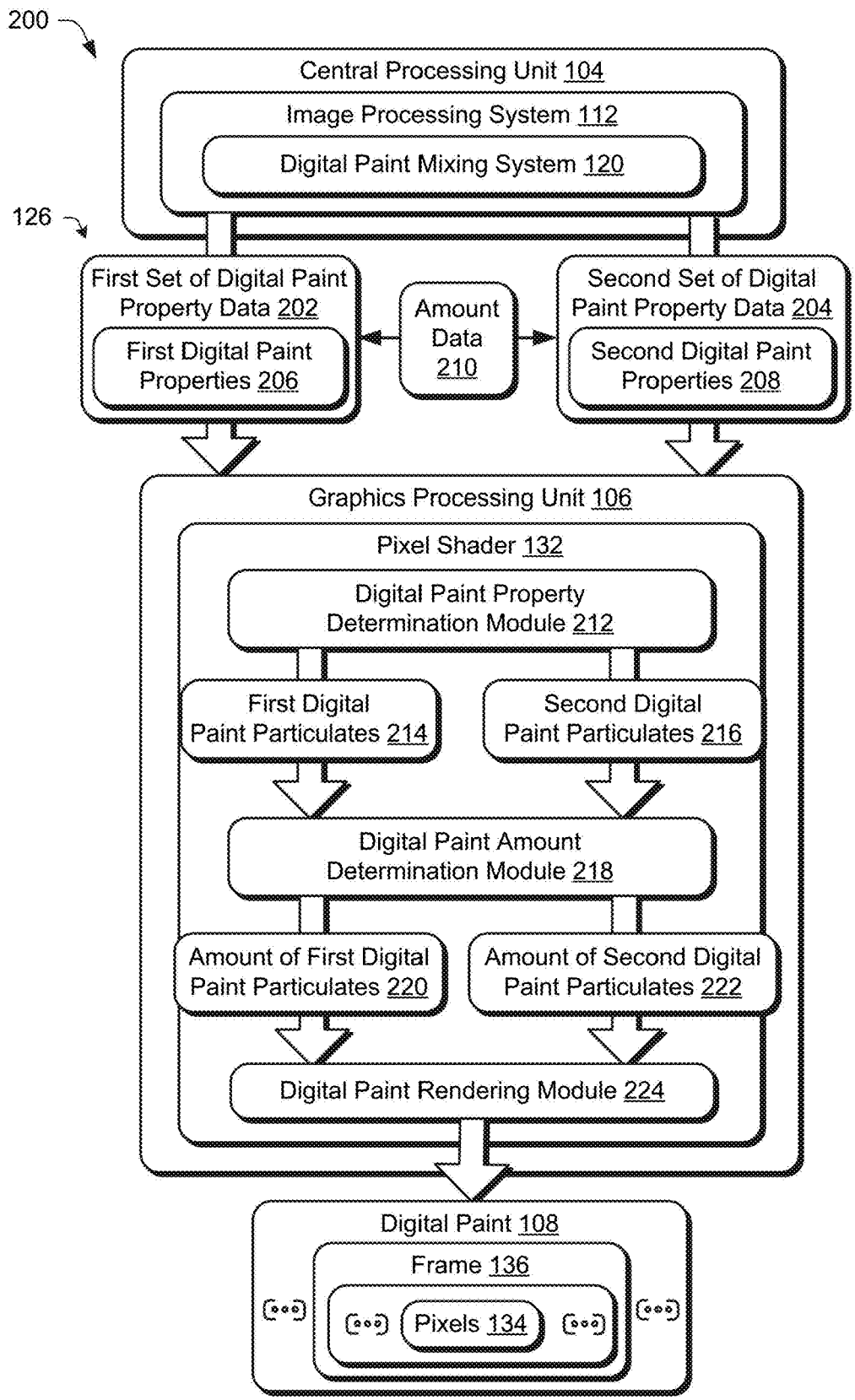
FIG. 2 depicts a system showing operation of a digital paint mixing system of a central processing unit and a pixel shader of a graphics processing unit of FIG. 1 in greater detail.

FIG. 2 depicts a system 200 showing operation of the digital paint mixing system 120 of the CPU 104 and pixel shader 132 of the GPU 106 in greater detail. FIG. 3 depicts a procedure 300 in an example implementation of execution of the pixel shader 132 by the graphics processing unit 106 to generate digital paint 108 as feedback 124 in real time.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-3.

To begin, a user input is received by a digital paint mixing system 120 executed by a central processing unit 104 of a computing device 102. The user input specifies amounts of respective ones of a plurality of digital paint properties to be used to generate digital paint 108 (block 302). The digital paint mixing system 120, for instance, may output a control 122 that supports user interaction via touchscreen functionality of the display device 110 of FIG. 1 to both select which digital paint properties are to be used to generate digital paint 108 as well as amounts of the digital paint properties as digital paint property data 126. In the illustrated example of FIG. 2, this causes generation of a first set of digital paint property data 202 and a second set of digital paint property data 204 having respective first digital paint properties 208, second digital paint properties 208, and amount data 210 that specifies respective amounts of those properties.

The user, for instance, may select from representations of digital paint properties and even previously generated digital paint itself for inclusion as part of the control 122. The control 122 may then be manipulated to specify respective amounts of those digital paint properties as digital paint property data 126 to be used to generate the digital paint 108. Further discussion of user interaction with the control 122 is described in the following section with respect to FIGS. 4-9.

The data is communicated by the digital paint mixing system 120 from the central processing unit 104 to a pixel shader 132 of a graphics processing unit 106 (block 304). The digital paint 108 is then rasterized by the pixel shader 132 of the graphics processing unit 106 as a trait (e.g., color, alpha value, z-depth) for each pixel of a plurality of pixels 134 in a frame buffer based on the specified amounts of the respective ones of the plurality of digital paint properties (block 306). The pixel shader 132 is implemented as a set of instructions that are executable by the graphics processing unit 106 to apply the effects of the digital paint properties to generate a color of a pixel, e.g., color digital paint properties 128 and/or physical digital paint properties 130.

Color digital paint properties 128, for instance, may describe a particular hue (e.g., pigment) to be rendered for generation of the digital paint 108. Physical digital paint properties 130 may also describe hues and/or physical effects that are to be applied to generate a particular color for a pixel based on parameters specified by the properties. The physical digital paint properties 130, for instance, may be configured as executable code that mimics a spinning color wheel and an effect to be applied to respective colors as the wheel is "spun," to appear "wet." Accordingly, this physical digital paint property 130 may describe both color and a physical effect, itself, or a physical effect alone, e.g., to appear "wet," for pixels 134 to be rendered as part of generating the digital paint 108.

The pixel shader 132 of the GPU 106, for instance, receives instructions from the digital paint mixing system 130 of the CPU 104 as digital paint property data 126. The pixel shader 132 then determines traits of pixels 134 from the digital paint property data 126 to rasterize the digital paint 108. Values of these traits are stored in a frame buffer, e.g., a matrix in computer-readable memory of the computing device 102 of pixel values of color, z-depth, alpha value, and so forth. The rasterized digital paint (e.g., pixel values in the frame buffer) is then displayed by the display device 110 of the computing device 102 in real time from the frame buffer as the user input is received (block 308). Thus, execution of the pixel shader 132 by the graphics processing unit 106 may be used to adjust levels of light, darkness, color, contrast, saturation, brightness, textures, blur, light bloom, volumetric lighting, depth effects, Bokeh, cell shading, bump mapping, distortion, chroma keying, "magical" effects, and so on through use of a shading language described using the digital paint property data 126 to generate the digital paint 108.

Execution of the pixel shader 132 to generate the traits for the pixels 134 of the digital paint may be performed in a variety of ways. In one example, the digital paint property data 126 describe instructions for a frame 136 or a series of frames (e.g., as an animation) to render the digital paint. In the illustrated example, the digital paint property data 126 includes a first set of digital paint property data 202 for a first previously defined digital paint and a second set of digital paint property data 204 for a second previously defined digital paint. Thus, the first and second sets may include color and/or physical digital paint properties.

The pixel shader 132 begins by generating a first digital paint particulate 214 based on the first set of digital paint property data 202 and a second digital paint particulate 216 based on the second set of digital paint property data 204. Thus, each of the first and second digital paint particulates 214, 216 are generated separately.

A digital paint amount determination module 218 is then employed to determine an amount of the first digital paint particulates 220 and an amount of the second digital paint particulates 222 to be used for respective pixels 134 of the frame 136 of the digital paint 108. The determination of the amount by the digital paint amount determination module 218 is based on the amount data 210 received as part of the digital paint property data 126.

The digital paint rendering module 224 is then configured to rasterize the digital paint 108 to respective pixels based on the determined amounts of first and second digital paint particulates. Thus, this is used to combine the effects of the different digital paint properties of the particulate, but not mix the particulates together. In this way, the particulates and effects of those particulates may support interactions with each other, like oil and water, to determine a resulting color and other traits for the pixels 134 by addressing the particulates as atomic and separate units. Thus, this may expand a way in which the digital paint 108 may be generated by the pixel shader 132 to support both color and physical digital paint properties, and may do so in real time which is not possible in conventional color selection techniques.

Control of Digital Paint Property Selection and Use

Figure 4:
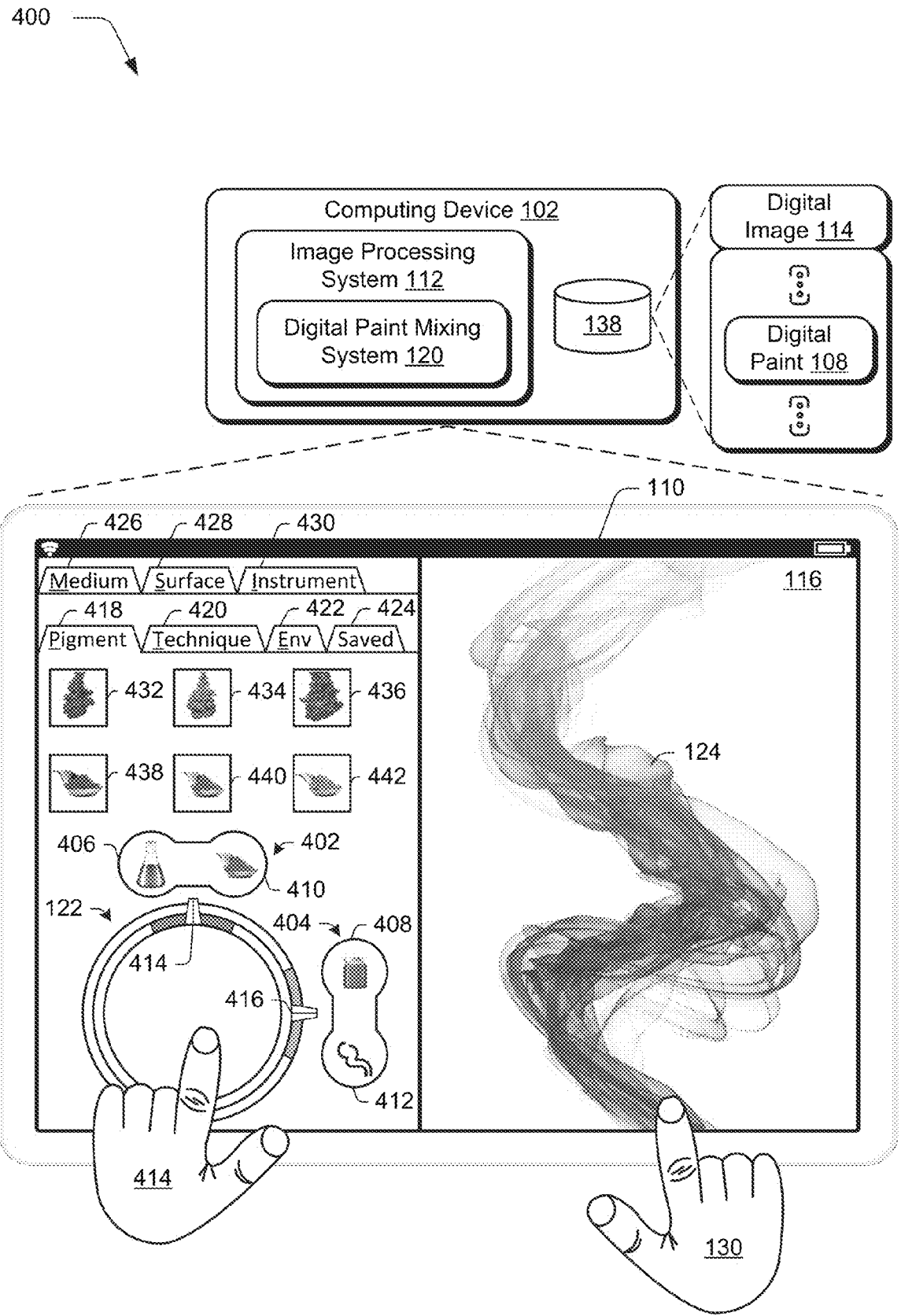
FIG. 4 is an illustration of an environment in an example implementation that is operable to employ a control to generate digital paint described herein.
Figure 5:
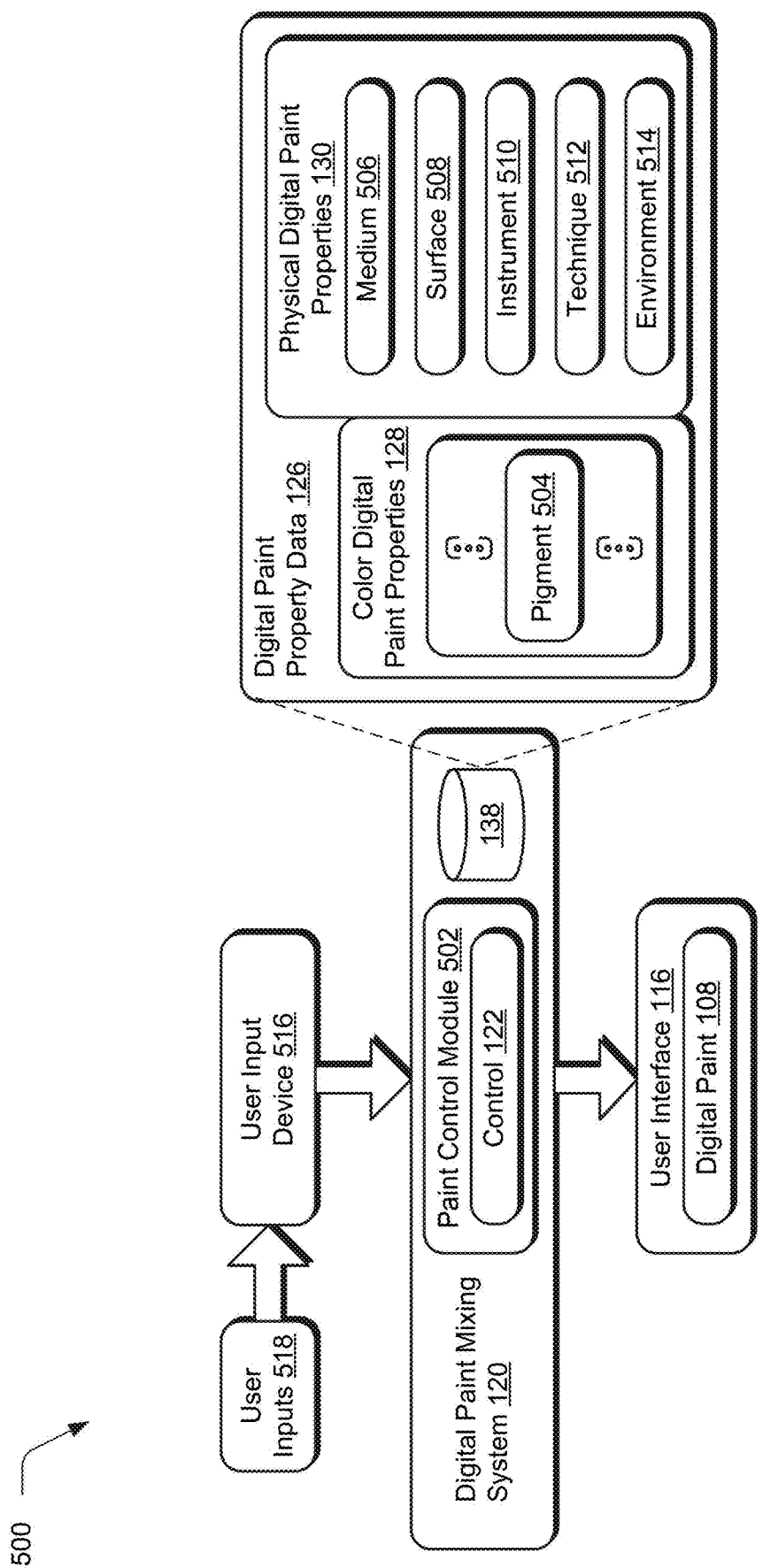
FIG. 5 depicts an example system showing operation of a digital paint mixing system of FIG. 4 in greater detail.
Figure 6:
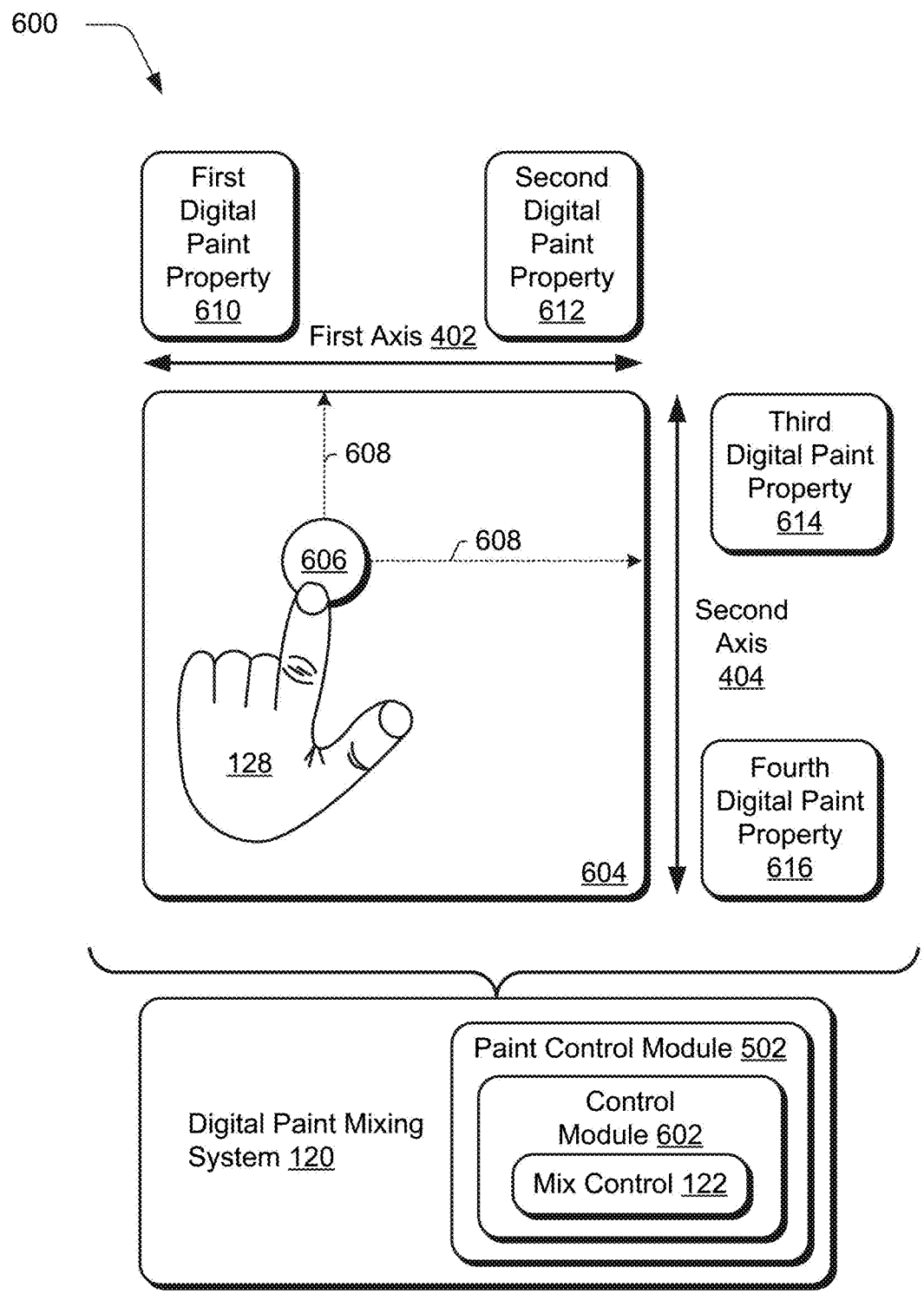
FIG. 6 depicts an example implementation of a control of FIG. 5 as a multi-axis control.
Figure 7:
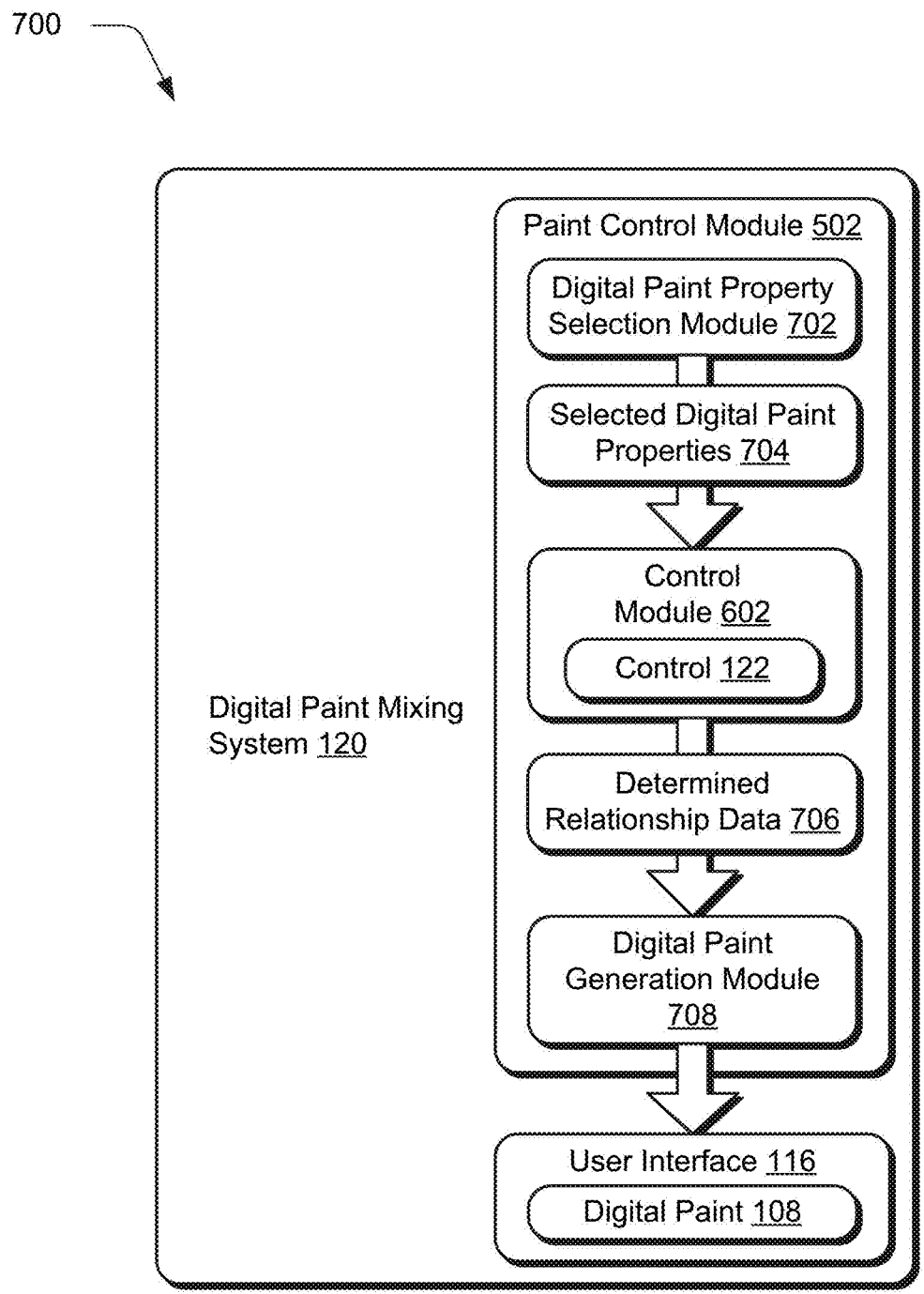
FIG. 7 depicts an example implementation showing operation of a paint control module and control of FIG. 6 in greater detail.
Figure 8:
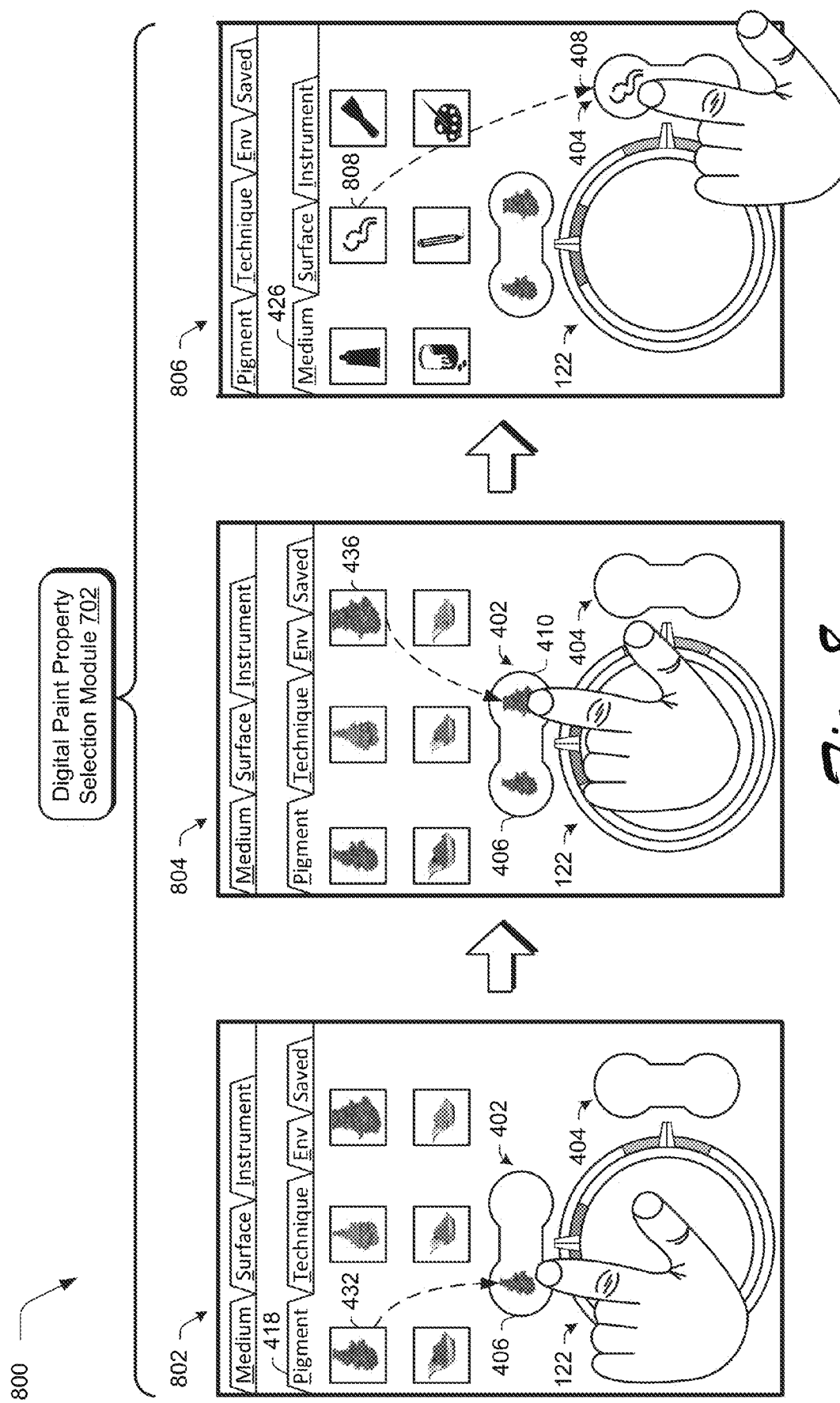
FIG. 8 depicts an example implementation of user selection of digital paint properties for use as part of the control.
Figure 9:
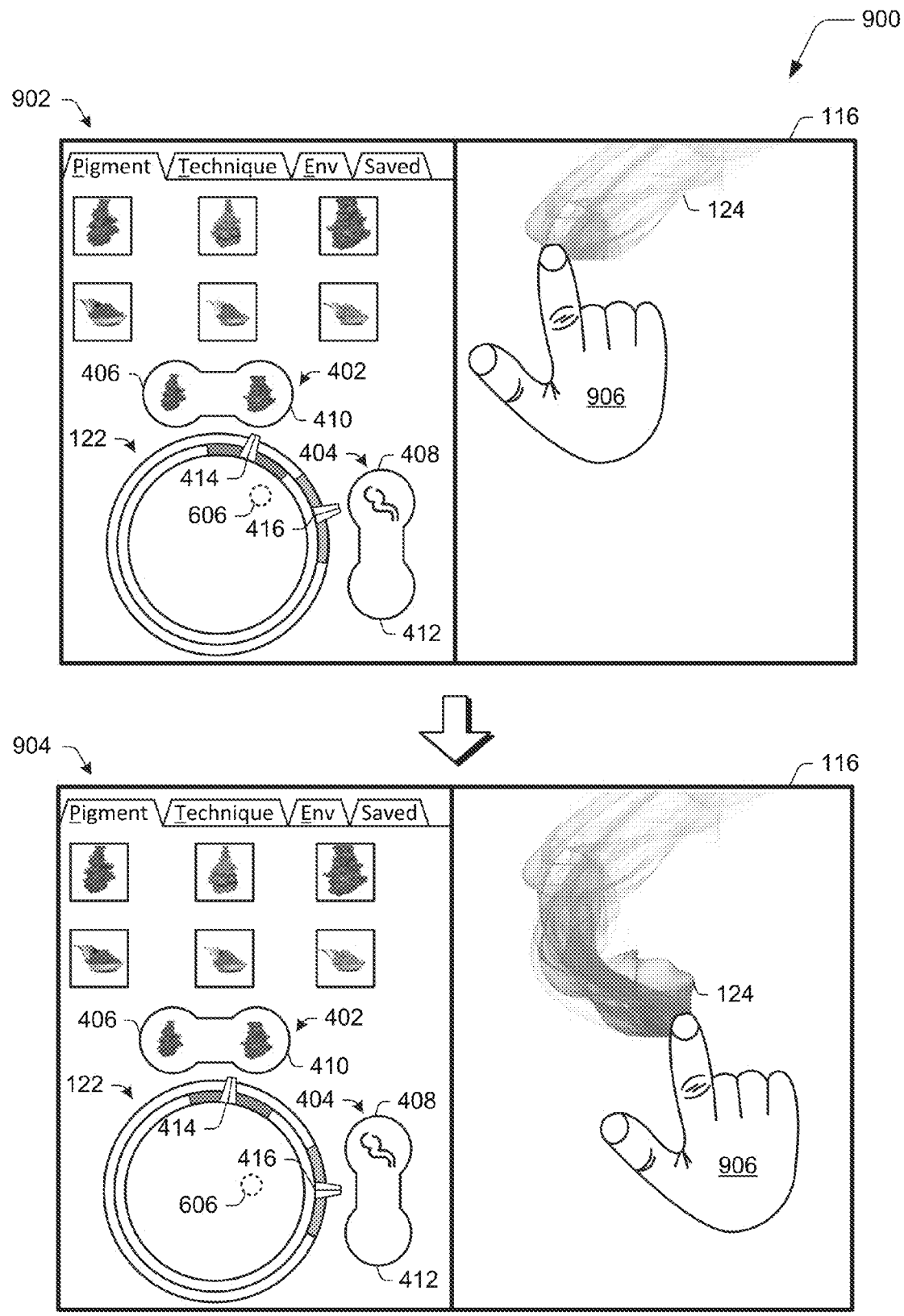
FIGS. 9 and 10 depict example implementations of generation and display of digital paint as feedback in real time caused through interaction with the control of FIG. 8.

FIG. 4 depicts an example system 400 showing selection and control of amounts of digital paint properties through use of the control 122. FIG. 5 depicts an example system 500 showing operation of the digital paint mixing system 120 of FIG. 1 in greater detail. FIG. 3 depicts an example implementation 300 of the control 122 of FIG. 2 as a multi-axis control. FIG. 4 depicts an example implementation 400 showing operation of the paint control module 502 and control 122 of FIG. 2 in greater detail. FIG. 5 depicts an example implementation 500 of user selection of digital paint properties for use as part of the control 122. FIGS. 6 and 7 depict example implementations of generation and display of digital paint as feedback in real time caused through interaction with the control 122 of FIG. 5. FIG. 8 depicts a procedure 800 in an example implementation in which user selection of digital paint properties and user inputs via a control are used to generate digital paint that is output in a user interface. FIG. 9 depicts examples of physical digital paint properties.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 4-12.

In the previous section, generation of digital paint 108 by a pixel shader 132 in real time is described based on digital paint property data 126 based on user interaction with a control 122 output in a user interface 116. The control 122 may be configured in a variety of ways. In the illustrated example, the control 122 is configured to support multi-axis control through use of a first axis 402 and a second axis 404.

The first and second axes 402, 404 each include respective first ends 406, 408 and second ends 410, 412. The first and second ends 406-412 correspond to respective digital paint properties that are user selected. Interaction with the control 122 is then used to control the amounts of these digital paint properties that are used to generate the digital paint 108, e.g., as gradations between the options at respective ends of the first and second axes 402, 404. In an implementation, the gradations are not linear such that movement along the first and second axes 402, 408 specifies amounts of respective digital paint properties that are not linear, e.g., geometric, and so forth.

A user input, for instance, may be detected as initiated by the first hand 414 of the user to move in X and/or Y directions. In this instance, movement in the X direction is used to control amounts of digital paint properties at first and second ends 406, 140 of the first axis 402 of the control 122. Likewise, movement in the Y direction is used to control amounts of digital paint properties at first and second ends 408, 412 of the second axis 408 of the control 122.

In one example, the input is implemented as a single multi-axis user input to specify an inverse relationship between digital paint properties at the first and second ends 406-412 of the respective first and second axes 402, 404, which may or may not be linear. Accordingly, an increase in an amount at one end of the axis causes a corresponding decrease in an amount at the other end of the axis through interaction with the control 122 through a plurality of gradations. Indications 414, 416 may also be included as part of the control 122 to indicate these relative amounts of digital paint properties to be used to generate the digital paint 108 of the respective first and second axes 402, 404.

The control 122 may be used to specify a variety of different amounts and types of digital paint properties. Examples of digital paint properties include color digital paint properties, referred to as pigments 418. Color digital paint properties, as pigments 418, describe hues of colors. Hues are an attribute of color by virtue of which it is discernible as red, green, blue, and so on, which is dependent on its dominant wavelength, and independent of intensity or lightness. A user selection, for instance, may be received through interaction with the user interface 116 to select from a variety of pigment options 432, 434, 436, 438, 440, 442 for use at particular ends of the control 122. These selections may then be used through interaction with the control 122 to generate digital paint 108 having a desired hue.

The digital paint properties may also include physical digital paint properties. Examples of physical digital paint properties include medium 426 (e.g., chalk, ink), surface 428 (e.g., paper, metal), instrument 430 used to apply the medium (e.g., brush, pencil), technique 420 used by the instrument to apply the medium (e.g., layered, blending), 422 environment in which the medium and surface as disposed (e.g., lighting conditions, meta-conditions such as particle gravity and repulsion), and so forth. The paint generation control portion 120 of the user interface also includes an option for selection of saved 424 instances of digital paint 108, e.g., as "containers."

In this way, a user may select which digital paint properties are to be used as a basis to generate the digital paint 108, control amounts of the digital paint properties used in the generation through interaction with the control 122, and output a result of this generation as feedback 124 in the user interface 116, e.g., in real time. As a result, the digital paint mixing system 120 supports efficient and intuitive techniques to indicate an effect of interaction of these digital paint properties with each other as part of generating the digital paint 108. This digital paint 108 may then be leveraged in a variety of ways, such as to incorporate the digital paint 108 as part of a digital image 114 configured to be rendered by the display device 110.

The system 500 of FIG. 5 depicts the digital paint mixing system 120 of FIG. 4 in greater detail. The digital paint mixing system 120 includes a control 122 that is configured to specify digital paint property data 126 to be used to generate digital paint 108. The digital paint property data 126 is illustrated as stored in a storage device 138 of the computing device 102. As previously described, the digital paint property data 126 may include color paint properties 128, such as pigments 504. The digital paint property data 126 may also include physical paint properties 130, including medium 506, surface 508, instrument 510, technique 512, and environment 514.

A user input device 516 is configured to receive user inputs 518 both to select digital paint properties to be used to generate the digital paint 108 as well as to specify amounts of the digital paint properties. The digital paint 108 is then output in the user interface 116, e.g., for display on the display device 110 of FIG. 1. The control 122 is configurable in a variety of ways to facilitate this selection and specification, and example of which is described in the following and shown in a corresponding figure.

FIG. 6 depicts a system 600 in an example implementation showing the control 122 of FIG. 5 as implemented as a multi-axis control. The control 122 is implemented in this example by a control module 602 of the paint control module 502. The control module 602 uses a first axis 402 and a second axis 404 to define a multi-axis input space 604, which in this instance is defined using X and Y axes or other perpendicular relationship. Other examples are also contemplated, including addition of a Z axis in a virtual or augmented reality implementation.

In this example, a single user input 606 is usable to define a relationship 608 with respect to both the first and second axes 402, 404. This relationship 608 may then be used to specify amounts of digital paint properties associated with those axes that are to be used to generate digital paint 108. First and second digital paint properties 610, 612, for instance, are defined at opposing ends of the first axis 402 that corresponds to an X axis in the multi-axis input space 604. Likewise, third and fourth digital paint properties 614, 616 are defined at opposing ends of the second axis 404.

The single user input 606 thus defines a relationship 608 between the opposing ends of the first axis 402 as well as the opposing ends of the second axis 404. From this, the control module 602 determines amounts of associated first, second, third, and fourth digital paint properties 610-616 to be used to generate digital paint 108. The multi-axis input space 604, for instance, may define a grid, from which, closeness of the single user input 606 to respective first and second axes 402, 404 (e.g., X and Y axes) is determined. Thus, the single user input 606 may be used to define a continuous inverse relationship between the digital paint properties defined at the ends of the first and second axes 132, 134, which may be linear or non-linear. In other words, greater amounts of a digital paint property at one end of an axis cause lesser amount of a digital paint property at another end of the axis in a linear or non-linear relationship. This user input may continue through continued movement of the user input 606 in the multi-axis input space 604 to make continued changes to these amounts, e.g., through different gradations between opposing ends of the axes.

FIG. 4 depicts a system 400 in an example implementation in which the control module 602 and control 122 are shown in greater detail as incorporated as part of the paint control module 502 to generate digital paint 108. To begin, the paint control module 502 includes a digital paint property selection module 702 that supports user interaction to select digital paint properties to be used by the control 122 of the control module 602.

FIG. 8 depicts an example implementation 800 of selection of digital paint properties for use by the control 122 by the digital paint property selection module 702 of FIG. 7. This implementation 800 is illustrated using first, second, and third stages 802, 804, 806. A user selection, for instance, is received of a first digital paint property and a second digital paint property via a user interface (block 1102), e.g., via a user input device 516. At the first stage 802, a finger of a user's hand is used to select a pigment 432 option from a menu of pigments, i.e., color digital paint properties. The represented pigment 432 is dragged to a first end 406 of a first axis 402 of the control 122. Likewise, at the second stage 804, the finger of the user's hand is used to select another pigment 436 option, which is the dragged to a second end 410 of the first axis 402.

At the third stage 806, a menu of medium 426 options is displayed in the user interface 116. From this, a medium option of a physical digital paint property (e.g., smoke 808) is selected for inclusion at a first end 408 of the second axis 404 of the control 122. The second end 412 of the second axis 404 of the control 122 is left blank (i.e., open) in this example, which also supports user interaction as further described below. Other examples of selection are also contemplated without departing from the spirit and scope thereof, such as use of a cursor control device, spoken utterance, and so forth.

Thus, the selected digital paint properties 704 are provided from the digital paint property selection module 702 to the control module 602. In response, the control module 602 associates the first digital paint property (e.g., pigment 432 option) with a first end 406 of the first axis 402 of the control 122 and the second digital paint property (e.g., pigment 436 option) with the second end 410 of the first axis 402 of the control 122 (block 1104).

Likewise, a third digital paint property (e.g., smoke 808) is associated with a first end 408 of the second axis 404 of the control 122 and a fourth "null" digital paint property is associated with a second end 412 of the second axis 404. This configures the control 122 to implement a multi-axis input space 604 that is usable via a single user input 606. Other examples are also contemplated, such as a single axis or three or more axes input space, e.g., in a virtual reality space.

Referring again to FIG. 7, a user input 606 is received by the control module 602 involving user interaction with the control 122 via the user interface 116 (block 1106). From this, a relationship is determined by the control module 602 (e.g., as determined relationship data 406) of the user input 606 to the first and second ends of the axis of the control 122 in the user interface 116 (block 1108). The determined relationship data 706 is then provided to a digital paint generation module 708 to generate the digital paint 108 as specified by this data (block 1110), which is output in the user interface 116 (block 812) as described by the previous pixel shader section.

Figure 10:
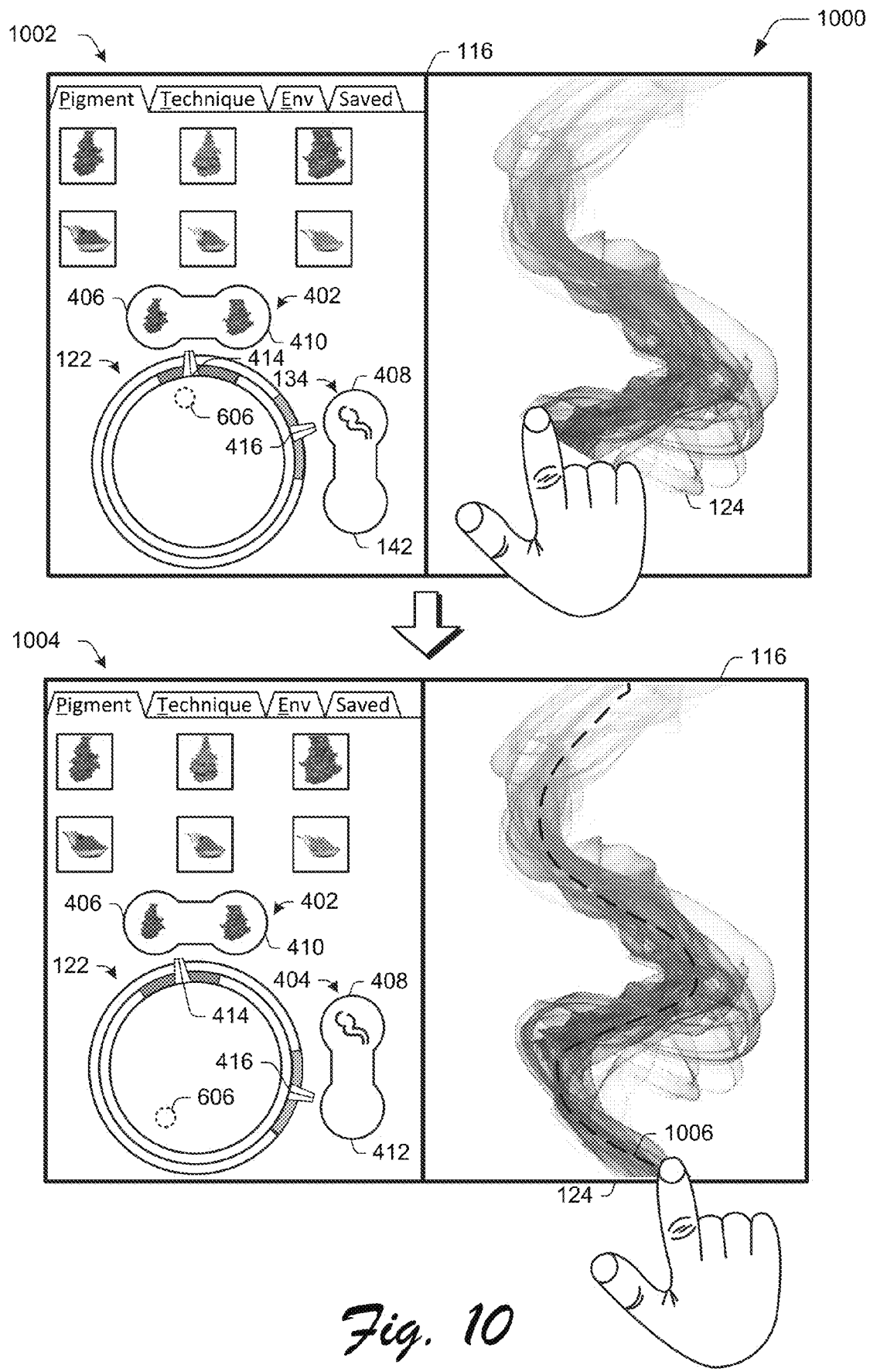
Figure 11:
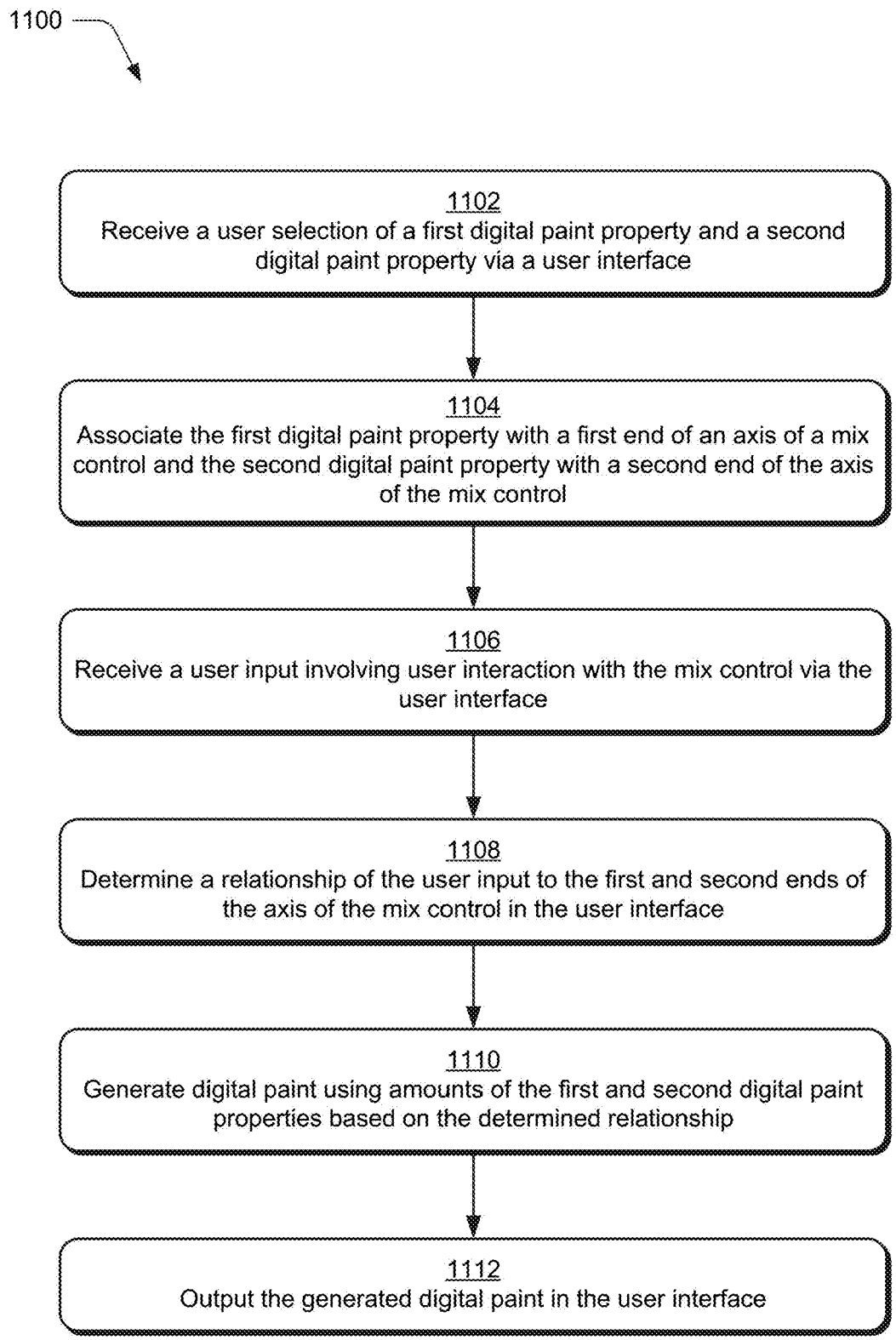
FIG. 11 is a flow diagram depicting a procedure in an example implementation in which user selection of digital paint properties and user inputs via a control are used to generate digital paint that is output in a user interface.

FIGS. 9 and 10 depict example implementations 900, 1000 of user interaction with the control 122 and generation of digital paint 108. FIGS. 9 and 10 are depicted using first, second, third, and fourth stages 902, 904, 1002, 1004 showing sequential user interaction with the control.

At the first stage 902, the first and second ends 406-412 of the first and second axes 402, 404 of the control 122 are configured as described in relation to FIG. 6. The control 122 is configured as a multi-axis control having a multi-axis input space implemented using concentric dials. Other examples are also contemplated of implementing a multi-axis input space (e.g., multiple sliders) or a single axis input space, e.g., a single slider.

At the first stage 902, a single user input 606 is received with respect to the first and second axes 402, 404, e.g., via a finger of the user's hand as detected using touchscreen functionality of the display device 110. The user input 606 in this instance is closer to the second end 410 than the first end 406 of the first axis 402. In response, digital paint 108 is generated by the digital paint generation module 708 having more of a pigment 436 option (e.g., blue) associated with the second end 410 than pigment 432 option (e.g., red) associated with the first end 406. These relative amounts are also illustrated by the indication 414 associated with the control 122.

Additionally, the user input 606 is disposed at the closest positioning available to the first end 408 of the second axis 404 and further away from the second end 412. In response, the digital paint 108 is also generated to have a maximum amount of a physical digital paint property associated with the first end 408 of the axis, e.g., smoke 808. Thus, the output of the generated digital paint is based on a combination of color digital paint properties and physical digital paint properties.

At the second stage 902, the single user input 606 is moved a greater amount along the second axis 404 than the first axis 402. In response, a slight color change is noted in the generation of the digital paint 108 to include more of the pigment 432 option associated with the first end 406 than the pigment 436 option associated with the second end 410 of the first axis 402.

Additionally, a larger change is exhibited in the generation of the digital paint 108 to include additional amounts of a null option of the second end 412 of the second axis 404 and thus less of a smoke 808 physical digital paint property. Thus, the null option of the second axis 404 supports definition of amounts of the digital paint property on an opposing side of the axis, solely, without affecting another digital paint property.

At the third stage 1002, the user input 606 defines a relationship between the first and second ends 406, 410 of the first axis 402 to further increase an amount of the pigment 432 option associated with the first end 406 than the pigment 436 option associated with the second end 410. This causes the digital paint to appear as magenta as feedback 124 in this example rather than purely blue as shown in the first and second stages 902, 904. Further, the single user input 606 defines a return to a maximum amount of a digital paint property associated with a first end 408 as opposed to a second end 412 of the second axis 404. This causes the feedback 124 to exhibit a maximum amount of the smoke 808 physical digital paint property.

At the fourth stage 1004 in this example, the user input 606 defines a relationship between the first and second ends 406, 410 of the first axis 402 as a maximum amount of the pigment 432 option associated with the first end 406 and minimum amount of the pigment 436 option associated with the second end 410. This causes the digital paint as feedback 124 to appear more red in this example than the magenta color as shown at the third stage 1002 and the blue as shown in the first and second stages 902, 904.

Further, the single user input 606 defines a return to a lesser amount of a digital paint property associated with a first end 408 as opposed to a second end 412 of the second axis 404. This causes the digital paint 108 to reduce the amount of the smoke 808 physical digital paint property used to generate the digital paint 108. Thus, the control 122 supports a single user input 606 to define a continuous inverse relationship (e.g., linear or non-linear) of digital paint properties defined at opposing axes, which may include combination of both color and physical digital paint properties.

Figure 12:
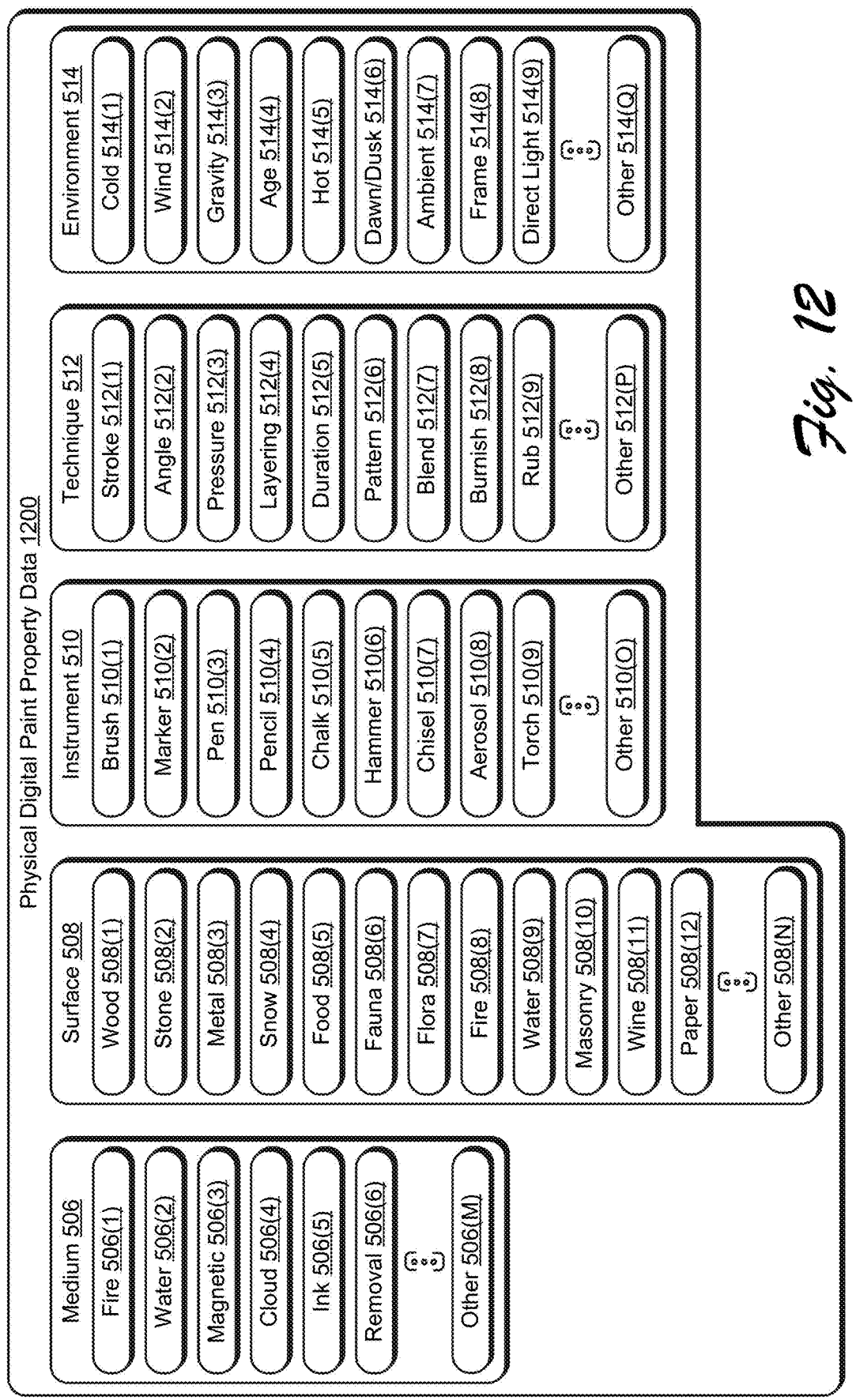
FIG. 12 depicts an example implementation of physical digital paint property data that serves as a basis to determine physical digital paint property interaction.

FIG. 12, for instance, depicts an example implementation of physical digital paint property data 1200 that includes physical digital paint properties including medium 506, surface 508, instrument 510, technique 512, and environment 514. There are a variety of types of mediums 506 that may be mimicked by digital paint 108, both that exist in the real world or are imaginary that expand "outside" of real world interactions. Thus, creation of the digital paint 108 by the digital paint mixing system 120 may be untethered from mimicking the physical world to creating digital paint 108 having any characteristic that can be imagined by the user and defined (e.g., mathematically) for rendering by the computing device 102.

Illustrated medium 506 examples include fire 506(1), water 506(2), magnetic 506(3), cloud 506(4), ink 506(5), removal 506(6), and other 506(M) mediums. Thus, the medium 506 describes what material is modeled as being applied to a surface 508.

Likewise, there are a variety of types of surfaces 508 that may be mimicked by digital paint that either mimic real world surfaces or non-existent surfaces that are imagined and interaction with is mathematically modeled as part of the data. Examples of surfaces 508 include wood 508(1), stone 508(2), metal 508(3), snow 508(4), food 508(5), fauna 508(60, flora 508(7), fire 508(8), water 508(9), masonry 508(10), wine 508(11), paper 508(12), and other 508(N)

surfaces. Thus, the surface 508 acts a base of the medium 506, e.g., is a substrate for the medium 506.

An instrument 510 refers to functionality of an instrument being mimicked to apply the medium 506 to the surface 508. Examples of instruments include a brush 510(1), marker 510(2), pen 510(3), pencil 510(4), chalk 510(5), hammer 510(6), chisel 510(7), aerosol 510(8), torch 510(9), and others 510(0). A technique 512 refers to a technique used by the instrument 510 to apply to medium 506 to the surface 508. Examples of techniques 512 include stroke 512(1), angle 512(2), pressure 512(3), layering 512(4), duration 512(5), pattern 512(6), blend 512(7), burnish 512(8), rub 512(9), and others 512(P).

An environment 514 refers to an environment in which the medium 506 is applied to the surface 508, e.g., by the instrument 510 using the technique 512. Examples of environments 514 includes cold 514(1), wind 514(2), gravity 514(3), age 514(4), hot 514(6), dawn/dusk 514(6), ambient 514(7), frame 514(8), direct light 514(9), and other 514(Q) environments. Thus, these variety of physical digital paint properties may describe a variety of physical characteristics modeled as part of generation of the digital paint 514 that include defined interactions between the properties.

The physical digital paint properties may also expand to realize capabilities that are not limited to the physical world, such as meta-conditions including particle gravity, attraction, sparkles, dynamic gradients and repulsion as part of an animation of the digital paint. The physical digital paint properties, for instance, may specify application to a surface to mimic waving of a wand. The digital paint, when "hitting" a substrate, may then sparkle, burst into stars, and so on. Thus, the physical digital paint properties permit user interaction to expand beyond selection of colors as limited by conventional systems to also include how those physical properties define how digital paint having those colors is perceived when rendered in a user interface.

Further, feedback mechanisms are also supported in which a real time output of the digital paint 108 is performed having amounts of digital paint properties are currently defined by the control 122. In this way, an effect of adjustment of the amounts of digital paint properties may be compared in succession, which is not possible in convention techniques that replaced a previous color with another, further discussion of which is described in the following section and shown in corresponding figures.

Digital Paint Generation Feedback

Figure 13:
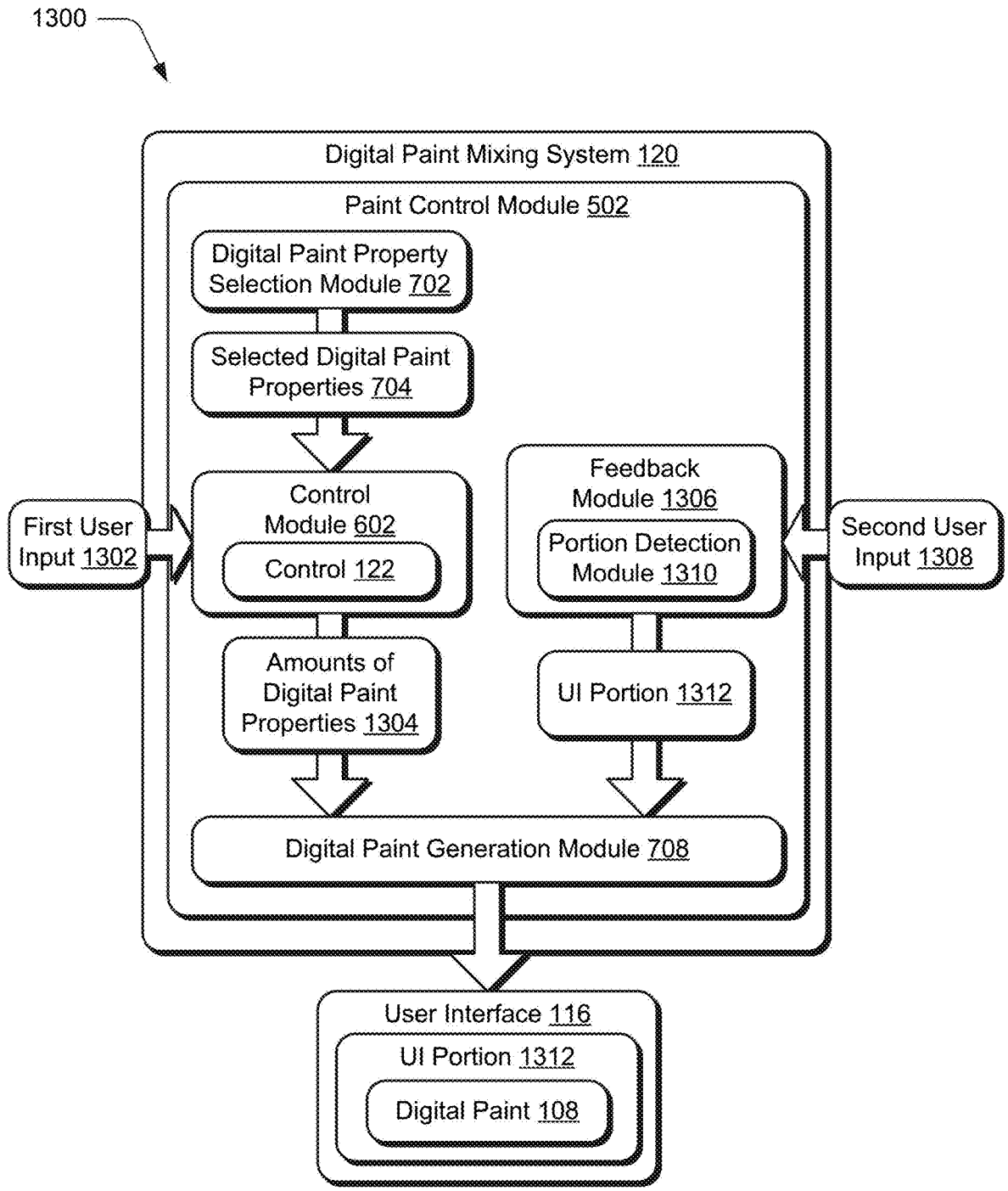
FIG. 13 depicts a system in an example implementation in which feedback is generated to apply digital paint generated based on user interaction with the control of FIG. 7 to a user-specified portion of a user interface.
Figure 14:
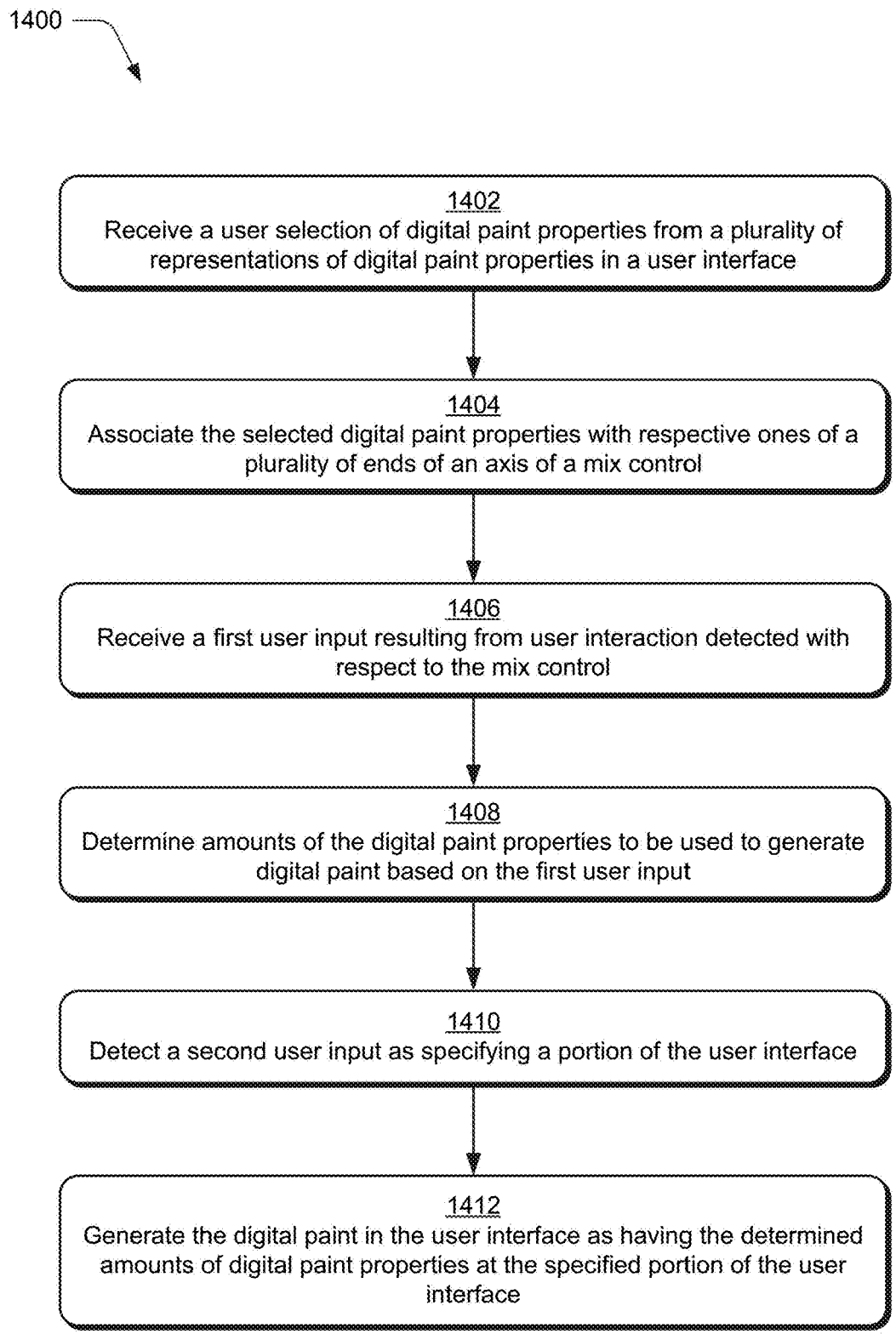
FIG. 14 is a flow diagram depicting a procedure in an example implementation of generation of feedback of digital paint generation in real time.

FIG. 13 depicts a system 1300 in an example implementation in which feedback 124 is generated as an application of digital paint 108 to a user-specified portion of a user interface 116 based on user interaction with the control 122. FIG. 14 depicts a procedure 1400 in an example implementation of generation of feedback of digital paint generation in real time.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made interchangeable to FIGS. 13-14 as well as the illustrated feedback examples of FIGS. 9-10.

In the previous section, interaction with the control 122 was described to generate digital paint having specified amounts of digital paint properties. Interaction with the control 122 may also be incorporated to support real time feedback (e.g., using the pixel shader 132 and GPU 106) as part of two part user interaction to generate the digital paint 108 having current amounts of digital paint properties. In this way, the paint control module 502 provides readily understood feedback to the user as to an effect of these digital paint properties and respective amounts on the generation of digital paint 108. Additionally, this feedback 124 may be output in a continuous manner such that the feedback is concurrently viewable over successive changes made to the digital paint properties. Thus, this feedback 124 permits a user to compare effects of changes using the feedback 124, which is not possible over conventional techniques that replaced one selected color with another and thus both are not concurrently viewable in a user interface. Further, the user may also specify where in the user interface 116 that feedback occurs, such as to mimic how to apply the generated digital paint 108 as part of digital image 114 in the future and thus gain additional insight into the generation of the digital paint 108.

The paint control module 502, as described in relation to FIG. 7, includes a digital paint property selection module 702 that is configured to receive a user selection of digital paint properties from a plurality of representations of digital paint properties in a user interface 116 (block 1402). The selected digital paint properties 704 are then associated with respective ones of a plurality of ends of an axis of a control 122 (block 1404) by the control module 602.

A first user input 1302 is then received that results from user interaction detected with respect to the control 122 (block 1406), e.g., from a first hand of a user. From this, amounts of digital paint properties 1304 are determined to be used to generate digital paint 108 based on the first user input 1302 (block 1408). These amounts of digital paint properties 1304 are communicated to the digital paint generation module 708 as previously described to be used as a basis to generate the digital paint 108 by the pixel shader of the GPU 106.

In this example, a second user input 1308 is also detected as specifying a portion of the user interface 116 (block 1410). The paint control module 502, for instance, includes a feedback module 1306 that is configured to generate feedback regarding user interaction with the control 122. To do so, a portion detection module 1310 first detects a UI portion 1312 as specified by the second user input 1308, e.g., coordinates of the UI defined using touchscreen functionality, a cursor control device, and so forth.

As shown at the fourth stage 1004 of FIG. 10, for instance, a freeform line 1006 is drawn in the user interface 116 by a second hand of a user. The freeform line 1006 is drawn simultaneously as the single user input 606 is received through interaction of a first hand of the user with the control 122. Other examples of selection of a UI portion 1312 in the user interface 116 are also contemplated, such as to tap a particular shape, and so forth. Thus, in this example two-handed simultaneous interaction with the user interface 116 is supported to both specify the amounts of the digital paint properties and the portion of the user interface 116.

The amounts of digital paint properties 1304 based on the first user input 1302 and UI portion 1312 based on the second user input 1308 are provided to the digital paint generation module 708. The digital paint 108 is then generated by the digital paint generation module 708 in the user interface 116 as feedback 124. The digital paint 108 has the determined amounts of digital paint properties 1304 at the detected portion 1312 of the user interface 116 (block 1412).

As a result, the generated digital paint 108 follows the UI portion 1312 (e.g., the freeform line 1006) as it is detected in the user interface 116. Thus, the generation of the digital paint 108 may provide real time feedback to the user as to the amounts as adjustments are made via the control 122 and output of the digital paint 108 as shown in the first, second, third, and fourth stages 902, 904, 1002, 1004 of FIGS. 9 and 10. In this way, the digital paint mixing system 120 provides continuous feedback regarding changes made to the digital paint 108 based on changes in the digital paint properties and may compare these changes to each other. This is not possible in conventional techniques in which individual user selections caused replacement of a previous color with a changed color and as such a user may not simultaneously view the difference in the digital paint caused by these changes.

Example System and Device

Figure 15:
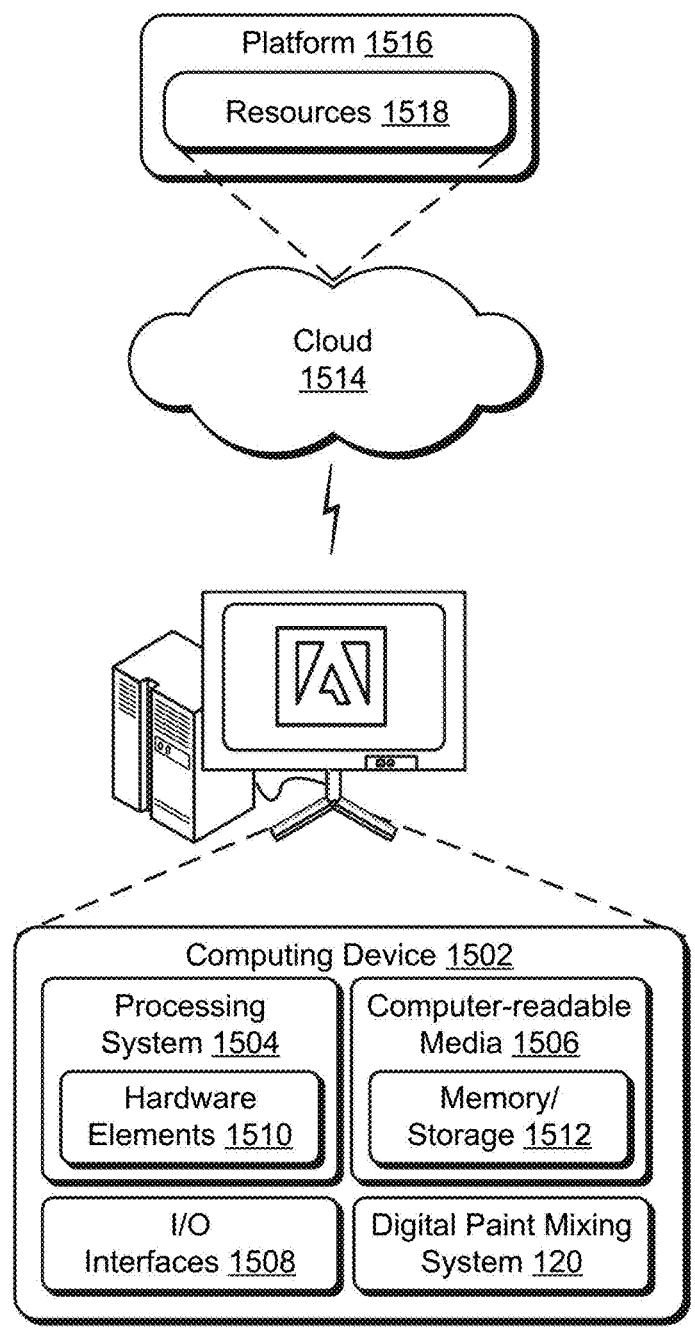
FIG. 15 illustrates an example system including various components of an example device that can be implemented as any type of computing device as described and/or utilize with reference to FIGS. 1-14 to implement embodiments of the techniques described herein.

FIG. 15 illustrates an example system generally at 1500 that includes an example computing device 1502 that is representative of one or more computing systems and/or devices that may implement the various techniques described herein. This is illustrated through inclusion of the digital paint mixing system 120. The computing device 1502 may be, for example, a server of a service provider, a device associated with a client (e.g., a client device), an on-chip system, and/or any other suitable computing device or computing system.

The example computing device 1502 as illustrated includes a processing system 1504, one or more computer-readable media 1506, and one or more I/O interface 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware element 1510 that may be configured as processors, functional blocks, and so forth. This may include implementation in hardware as an application specific integrated circuit or other logic device formed using one or more semiconductors. The hardware elements 1510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1506 is illustrated as including memory/storage 1512. The memory/storage 1512 represents memory/storage capacity associated with one or more computer-readable media. The memory/storage component 1512 may include volatile media (such as random access memory (RAM)) and/or nonvolatile media (such as read only memory (ROM), Flash memory, optical disks, magnetic disks, and so forth). The memory/storage component 1512 may include fixed media (e.g., RAM, ROM, a fixed hard drive, and so on) as well as removable media (e.g., Flash memory, a removable hard drive, an optical disc, and so forth). The computer-readable media 1506 may be configured in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch from a user's finger or stylus), a camera (e.g., which may employ visible or non-visible wavelengths such as infrared frequencies to recognize movement as gestures that do not involve touch), spatially aware input device (e.g., motion tracking), and so forth. Examples of output devices include a display device (e.g., a monitor or projector), speakers, a printer, a network card, tactile-response device, and so forth. Thus, the computing device 1502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1510 and computer-readable media 1506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of a module that is executable by the computing device 1502 as software may be achieved at least partially in hardware, e.g., through use of computer-readable storage media and/or hardware elements 1510 of the processing system 1504. The instructions and/or functions may be executable/operable by one or more articles of manufacture (for example, one or more computing devices 1502 and/or processing systems 1504) to implement techniques, modules, and examples described herein.

The techniques described herein may be supported by various configurations of the computing device 1502 and are not limited to the specific examples of the techniques described herein. This functionality may also be implemented all or in part through use of a distributed system, such as over a "cloud" 1514 via a platform 1516 as described below.

The cloud 1514 includes and/or is representative of a platform 1516 for resources 1518. The platform 1516 abstracts underlying functionality of hardware (e.g., servers) and software resources of the cloud 1514. The resources 1518 may include applications and/or data that can be utilized while computer processing is executed on servers that are remote from the computing device 1502. Resources 1518 can also include services provided over the Internet and/or through a subscriber network, such as a cellular or Wi-Fi network.

The platform 1516 may abstract resources and functions to connect the computing device 1502 with other computing devices. The platform 1516 may also serve to abstract scaling of resources to provide a corresponding level of scale to encountered demand for the resources 1518 that are implemented via the platform 1516. Accordingly, in an interconnected device embodiment, implementation of functionality described herein may be distributed throughout the system 1500. For example, the functionality may be implemented in part on the computing device 1502 as well as via the platform 1516 that abstracts the functionality of the cloud 1514.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a two-part digital paint generation and feedback environment, a method implemented by at least one computing device, the method comprising:
   receiving, by the at least one computing device, a first user input resulting from user interaction detected with respect to a control in a user interface;
   determining, by the at least one computing device, amounts of digital paint properties to be used to generate digital paint based on the first user input;
   detecting, by the at least one computing device, a second user input as specifying a portion of the user interface, the second user input detected simultaneously to the user interaction; and
   generating, by the at least one computing device, the digital paint in the user interface, in real time as the second user input is detected, having the amounts of the digital paint properties and in the portion of the user interface.

2. The method as described in claim 1, wherein the digital paint is output in the user interface as feedback to indicate an effect of a plurality of changes in the amounts of the digital paint properties concurrently in the user interface.

3. The method as described in claim 1, further comprising:
   receiving, by the at least one computing device, a user selection of the digital paint properties from a plurality of representations of the digital paint properties in the user interface; and
   associating the user selection of the digital paint properties with respective ends of a plurality of ends of an axis of the control as a basis of the determining.

4. The method as described in claim 3, wherein the plurality of representations of the digital paint properties include color digital paint properties as pigments.

5. The method as described in claim 3, wherein the plurality of representations of the digital paint properties include physical digital paint properties.

6. The method as described in claim 5, wherein the physical digital paint properties include medium properties, surface properties, instrument properties, technique properties, and environment properties.

7. The method as described in claim 1, wherein the control is a multi-axis control configured to determine a relationship of the first user input as a single user input to a plurality of ends of the multi-axis control in the user interface that correspond to respective digital paint properties of the digital paint properties.

8. The method as described in claim 7, wherein the multi-axis control is configured using two concentric dials.

9. The method as described in claim 1, wherein the control includes a plurality of indications, the plurality of indications of the control indicating relative amounts of the digital paint properties.

10. In a two-part digital paint generation and feedback environment, a system comprising:
   a control module implemented at least partially in hardware of at least one computing device to determine amounts of digital paint properties to be used to generate digital paint based on a first user input, the first user input resulting from user interaction detected with respect to a control in a user interface; and
   a feedback module implemented at least partially in the hardware of the at least one computing device to:
      detect a second user input specifying a portion of the user interface, the first user input and the second user input being simultaneous; and
      generate the digital paint in the portion of the user interface in real time as having the amounts of the digital paint properties.

11. The system as described in claim 10, wherein the portion is a freeform line.

12. The system as described in claim 10, further comprising a digital paint property selection module configured to receive a user selection of the digital paint properties from a plurality of representations of the digital paint properties in the user interface.

13. The system as described in claim 12, wherein the plurality of representations of the digital paint properties include color digital paint properties as pigments.

14. The system as described in claim 12, wherein the plurality of representations of the digital paint properties include physical digital paint properties.

15. The system as described in claim 14, wherein the physical digital paint properties include medium properties, surface properties, instrument properties, technique properties, and environment properties.

16. The system as described in claim 10, wherein the control is a multi-axis control configured to determine a relationship of the first user input as a single user input to a plurality of ends of the multi-axis control in the user interface that correspond to respective digital paint properties of the digital paint properties.

17. In a two-part digital paint generation and feedback environment, a system comprising:
   means for associating digital paint properties with respective ends of a plurality of ends of axes of a multi-axis control in a user interface in response to user selection;
   means for determining amounts of the digital paint properties to be used to generate digital paint based on a first user input, the first user input resulting from user interaction detected with respect to the multi-axis control in the user interface; and
   means for detecting a second user input specifying a portion of the user interface, the second user input detected simultaneously to the user interaction; and
   means for generating the digital paint in the portion of the user interface in real time as having the amounts of the digital paint properties.

18. The system as described in claim 17, wherein the digital paint properties include color digital paint properties as pigments and physical digital paint properties.

19. The system as described in claim 18, wherein the physical digital paint properties include medium properties, surface properties, instrument properties, technique properties, and environment properties.

20. The system as described in claim 17, wherein the multi-axis control is configured to determine a relationship of the first user input as a single user input to the plurality of ends of the axes of the multi-axis control in the user interface that correspond to respective digital paint properties of the digital paint properties.

* * * * *